United States Patent
Drescher

(10) Patent No.: US 9,542,848 B2
(45) Date of Patent: Jan. 10, 2017

(54) ADJUSTMENT OF VEHICLE ALERTS BASED ON RESPONSE TIME LEARNING

(71) Applicant: Continental Automotive Systems, Inc., Auburn Hills, MI (US)

(72) Inventor: Susan Adelle Drescher, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/629,961

(22) Filed: Feb. 24, 2015

(65) Prior Publication Data

US 2015/0287325 A1 Oct. 8, 2015

Related U.S. Application Data

(60) Provisional application No. 61/976,589, filed on Apr. 8, 2014.

(51) Int. Cl.
*B60Q 1/00* (2006.01)
*G08G 1/16* (2006.01)
*B60K 28/00* (2006.01)

(52) U.S. Cl.
CPC ............ *G08G 1/167* (2013.01); *B60K 28/00* (2013.01); *G08G 1/166* (2013.01)

(58) Field of Classification Search
CPC ........ G06Q 50/18; G06Q 10/00; G06Q 10/10; G06Q 30/00; G06Q 30/0609; G06Q 40/12; G06Q 20/14; G06Q 20/206; G06Q 20/40145; G06Q 30/0241; G06Q 30/06; G06Q 40/025; G06Q 40/08; G06F 3/03545

USPC ................ 340/435, 439, 901, 903, 904, 436,340/437–438, 463, 461, 471, 472, 539.1,340/539.22, 568.1

See application file for complete search history.

(56) References Cited

U.S. PATENT DOCUMENTS

| | | | |
|---|---|---|---|
| 6,226,389 B1* | 5/2001 | Lemelson | G01S 13/931 382/104 |
| 2004/0088097 A1* | 5/2004 | Fujinami | B60T 7/22 701/70 |
| 2004/0218766 A1* | 11/2004 | Angell | H04B 10/1149 381/86 |
| 2008/0042814 A1* | 2/2008 | Hurwitz | B60Q 9/008 340/435 |
| 2011/0199202 A1* | 8/2011 | De Mers | A61B 5/18 340/439 |
| 2011/0255711 A1* | 10/2011 | Ivey | H04R 1/028 381/104 |

(Continued)

*Primary Examiner* — Daniel Previl

(57) ABSTRACT

An apparatus and system for alerting a driver within an automotive vehicle is provided. An alerting device is disposed within the vehicle, which is configured to alert a driver. A controller is operable to activate the alerting device to produce an alert. A hazard detecting device is configured to detect a hazard. The controller is configured to activate the alerting device to produce the alert if the hazard detecting device detects a hazard. The alert is produced a predetermined reaction time period before a desired driver response. The controller is configured to determine a driver response time. The driver response time includes the time from the alert to an actual driver response. The controller is configured to alter the predetermined reaction time period based on the driver response time. A method for assisting a driver of a vehicle and a non-transitory machine-readable medium that provides instructions are also provided.

15 Claims, 5 Drawing Sheets

(56) References Cited

U.S. PATENT DOCUMENTS

2012/0140080 A1* 6/2012 Taylor ................ B60C 23/0408
348/148
2014/0371987 A1* 12/2014 Van Wiemeersch ..... B62D 1/04
701/41

* cited by examiner

ADJUSTMENT OF VEHICLE ALERTS BASED ON RESPONSE TIME LEARNING

CROSS REFERENCE TO RELATED APPLICATIONS

This application claims the benefit of U.S. Provisional Application No. 61/976,589 filed Apr. 8, 2014. The disclosure of the above application is incorporated herein by reference.

TECHNICAL FIELD

The present disclosure relates to automotive vehicles, and more particularly to systems, methods, and devices for automatically alerting a driver.

BACKGROUND

Advancements in available sensor technologies allow for improved safety systems for vehicles. One such improved system is an arrangement and method for detecting and avoiding collisions. This type of system is referred to as a driver assistance system. Driver assistance systems can include sensors located on the vehicle to detect an oncoming collision. The systems may warn the driver of various driving situations to prevent or minimize collisions using any number of available warning systems. Furthermore, driver assistance systems can provide specialized warnings for any number of conditions that could potentially lead to a collision. For example, alerts may be provided for lane departure warnings, forward collision, warnings, blind spot detection, etc.

Existing warning systems typically provide either an audible warning, a dashboard/windshield mounted visual cue, or a combination of the two. The dashboard/windshield mounted visual cues assume that the driver is attentive and forward facing. In cases where the driver is not attentive, or is looking elsewhere, the dashboard/windshield mounted visual cues are ineffective.

In addition, different drivers have different average reaction times in response to a vehicle alert. For example, some drivers take longer than others to response to an alert produced from a vehicle. Such drivers may not have enough time to react appropriately in response to the warning, which may result in compromising their safety or the safety of others around them. Other drivers may react quickly to warnings or alerts, such that an alert may come too early and be an annoyance. These drivers may attempt to deactivate the alert system altogether to avoid the annoyances of early alert signals. Accordingly, there exists a need for a driver alert system that provides safety benefits for various different kinds of drivers.

SUMMARY

Disclosed are a driver assistance apparatus, system, and method that are configured to adjust driver alerts based on learned response time of the driver.

In one form, which may be combined with or separate from other forms described herein, there is contemplated an apparatus for alerting a driver within an automotive vehicle. The apparatus includes an alerting device disposed within the vehicle. The alerting device is configured to alert a driver. A controller is controllably coupled to the alerting device. The controller is operable to activate the alerting device to produce an alert. A hazard detecting device is communicatively coupled to the controller. The hazard detecting device is configured to detect a hazard. The controller is configured to activate the alerting device to produce the alert if the hazard detecting device detects a hazard. The alert is produced a predetermined reaction time period before a desired driver response. The controller is configured to determine at least one driver response time. The driver response time includes the time from the alert to an actual driver response. The controller is configured to alter the predetermined reaction time period based on the driver response time.

In another form, which may be combined with or separate from the other forms described herein, a driver assistance system for alerting a driver within an automotive vehicle is provided. The driver assistance system includes an alerting system disposed within the vehicle. The alerting system is configured to alert a driver. A controller is controllably coupled to the alerting system. The controller is operable to activate the alerting system to produce an alert. A hazard detection system is communicatively coupled to the controller. The hazard detection system is configured to detect a hazard. The controller is configured to activate the alerting system to produce the alert if the hazard detection system detects a hazard. The alert is produced a predetermined reaction time period before a desired driver response. The controller is configured to determine at least one driver response time. The driver response time includes the time from the alert to an actual driver response. The controller is configured to alter the predetermined reaction time period based on the driver response time.

In yet another form, which may be combined with or separate from the other forms described herein, a method for assisting a driver of a vehicle is provided. The method includes identifying a hazard using a hazard detection system and producing an alert if a hazard is identified by the hazard detection system. The method includes producing the alert a predetermined reaction time period before a desired driver response. The method further includes determining a driver response time, wherein the driver response time includes the time from the alert to an actual driver response. The method also includes altering the predetermined reaction time period if the driver response time determined is outside of a predetermined range.

In still another form, which may be combined with or separate from the other forms described herein, there is contemplated a non-transitory machine-readable medium that provides instructions. When executed by a machine, the instructions cause the machine to perform certain operations, which include identifying a hazard using a hazard detection system and producing an alert if a hazard is identified by the hazard detection system, including producing the alert a predetermined reaction time period before a desired driver response. The operations also include determining a driver response time, the driver response time including the time from the alert to an actual driver response. Further, the operations include altering the predetermined reaction time period if the driver response time determined is outside of a predetermined range.

BRIEF DESCRIPTION OF THE DRAWINGS

The present disclosure will become more fully understood from the detailed description and the accompanying drawings, wherein.

DETAILED DESCRIPTION

Figure 1:
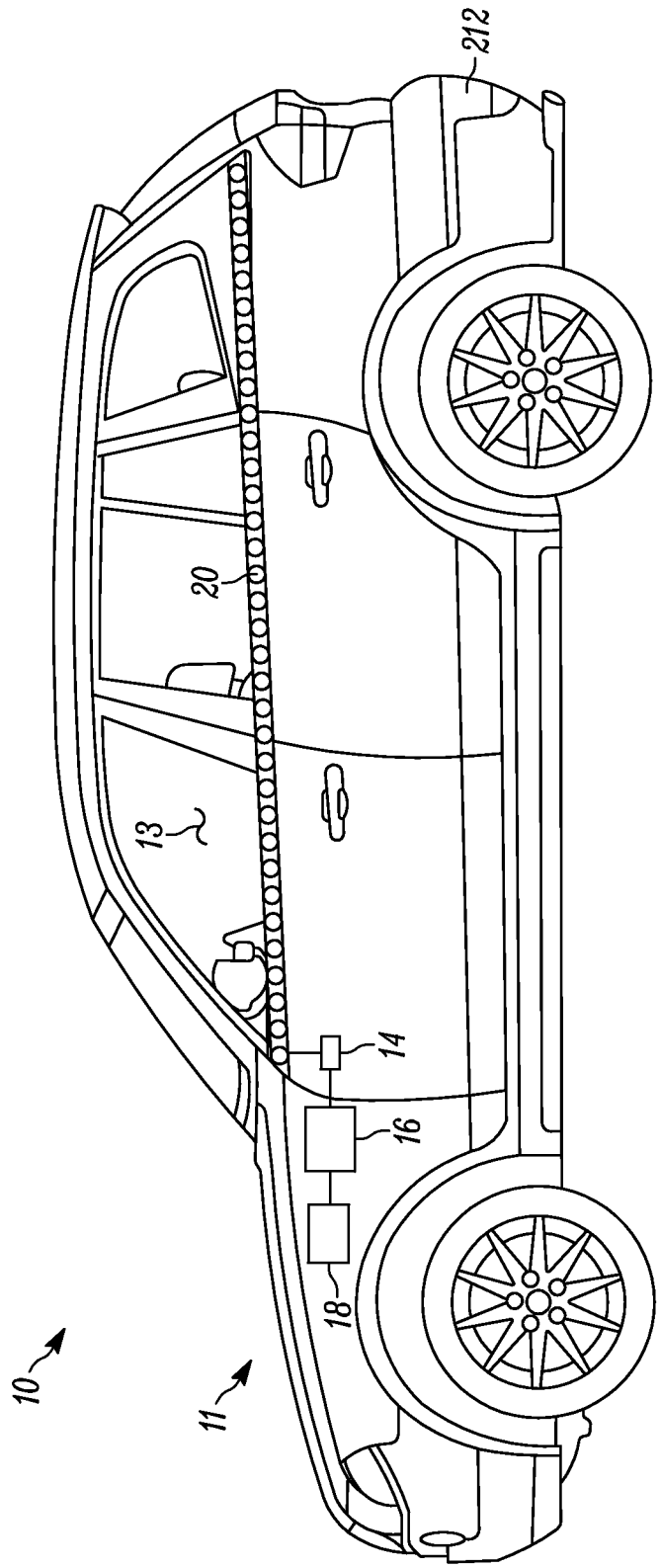
FIG. 1 is a schematic illustration of a side view of a vehicle including a driver assistance system, according to the principles of the present disclosure.

FIG. 1 illustrates a vehicle 10 having a driver assistance system 11. The driver assistance system 11 is an apparatus for alerting a driver in an automotive vehicle of potential hazards originating outside of the vehicle. The driver assistance system 11 includes an alerting system 14, which may include a plurality of lights 20, as shown in FIG. 1. Throughout this disclosure, the relative directions of forward and rear are in reference to the direction which an operator for the vehicle 10 would primarily be facing when operating the vehicle 10.

A controller 16 is controllably coupled to the alerting device 14, and the controller is operable to activate the alerting device 14 to produce an alert, which will be described in further detail below. A hazard detection system 18 is communicatively coupled to the controller 16. The hazard detection system 18 includes one or more hazard detecting devices, which may be spread in various places around the vehicle such as in a rear corner 212. The hazard detection system 18 and its associated sensors and/or devices are configured to detect a hazard near the vehicle 10.

The system 11 may also include a driver analyzer (not shown), which may be a monocular camera, binocular camera, or another type of sensing device capable of providing information used to determine the direction of a driver's gaze. The controller 16 may be connected to the driver analyzer and may analyze the image/data from the driver analyzer to determine the direction of the driver's focus. For example, the controller 16 may analyze the image recorded by a camera and determine the position of the driver's eyes, nose, and mouth. Based on this information the controller 16 can determine from the image the direction of the driver's focus. In some examples, the controller 16 can also use the image to recognize the driver and automatically activate driver specific settings. Alternately, the controller 16 can use any other technique to convert the data from the driver analyzer into an approximate direction of the driver's gaze.

In the illustrated example, the lights 20 are a ring of lights that substantially circumscribe the interior of the vehicle 10. The alert lights 20 are located at various heights within the vehicle 10 such that the lights are easily visible to the operator of the vehicle 10 regardless of the direction of the driver's focus.

In one example, the alert lights 20 are LED lights arranged around the interior of the passenger compartment of the vehicle 10. In the illustrated example, the alert lights 20 are located proximate to the window height and substantially extend around the interior of the passenger compartment. In another example, the alert lights 20 form a complete ring circumscribing the interior of the vehicle 10. In another example, the alert lights 20 include one or more physical breaks in the ring of lights to accommodate vehicle features, such as doors. The ring including physical breaks is referred to herein as substantially circumscribing the interior of the vehicle.

The alert lights 20 can activate in multiple colors and/or intensities to indicate the urgency of a particular warning. Furthermore, the alert lights 20 can activate sequentially creating a comet effect that directs the driver's focus to a warning zone. In such an example, the alert lights 20 initially light at a location in view of the driver's focus and sequentially transition to the warning zone.

In the event that the driver analyzer (not shown) is disabled, or there is no driver analyzer, the controller 16 assumes a worst case scenario and initiates the comet effect at a point in the halo alert lights 20 that is farthest away from the warning zone. In this way, the comet effect necessarily passes through the driver's focus as it transitions to the warning zone.

Figure 2B:
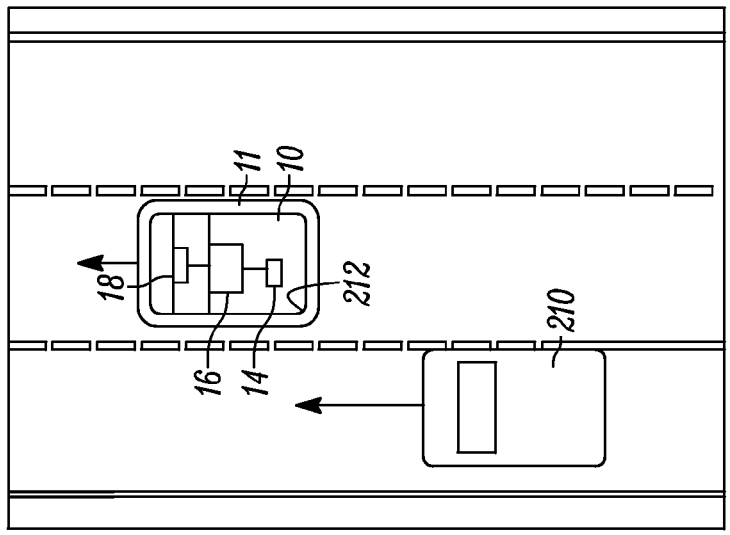
FIG. 2B is a schematic illustration of a top view of the vehicle of FIGS. 1-2A, with the adjacent vehicle in a second position, according to the principles of the present disclosure.
Figure 2A:
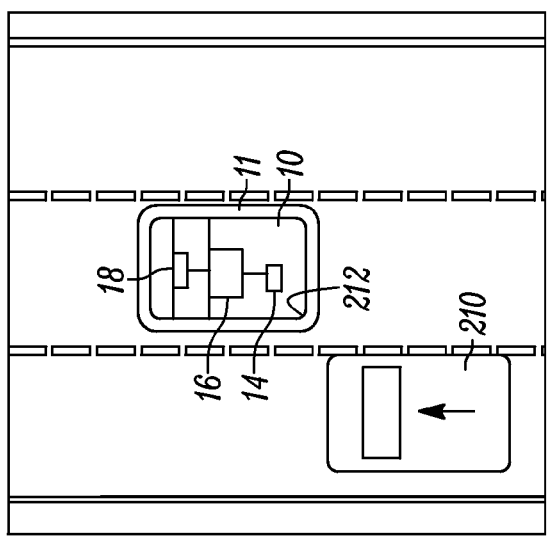
FIG. 2A is a schematic illustration of a top view of the vehicle of FIG. 1, with an adjacent vehicle in a first position, in accordance with the principles of the present disclosure.

FIGS. 2A and 2B illustrate the vehicle 10 having the driver assistance system 11, showing a blind spot detection alert. In the examples of FIGS. 2A and 2B, the above described warning zone would be the position of an object 210 in the blind spot of the vehicle 10. In FIG. 2A, the object 210 is located in the blind spot. The driver assistance system 11 lights the alert lights 20 at the rear driver's side corner 212 of the vehicle 10. This lighting location corresponds to the location of the object 210 detected in the blind spot. The object 210 is traveling at essentially the same speed as the vehicle 10. As the object 210 is maintaining position in the blind spot, the alert lights 20 remain lit in the rear corner 212 of the vehicle indicating a potential continuous hazard. If the object 210 moves further along the side of the vehicle 10 the alert lights 20 sequentially light, transitioning to the location corresponding to the new position of the object 210.

In FIG. 2B, the hazard detection system 18 detects that the object 210 is moving relative to the vehicle 10. In this example, the alert lights 20 are illuminated along the length of the vehicle 10 on the driver's side to correspond to an increased warning zone, as compared to the warning zone of FIG. 2A. Further, in some examples, the alert lights 20 can change color to indicate warning intensity. For example, as shown in FIGS. 2A and 2B, the alert lights 20 may be illuminated in yellow when an object is detected in a blind spot and may change to red if a driver indicates a turn and/or lane change in the direction of the detected object 210.

In the embodiment illustrated in FIGS. 2A and 2B, the alert lights 20 light in green, yellow and red to indicate the severity of the warning. The colors green, yellow and red are for example only, and other colors may be used in addition to or in place of the listed colors. In addition to directing the driver's view toward a particular warning zone, as described above, the comet effect can direct the driver's focus to a dashboard, or any other position in the vehicle, depending on the type of warning being indicated.

In some examples, if the controller 16 determines the driver is looking away from the forward direction of travel, the alerting system 14 may cause the alert lights 20 to be lit starting in the current direction of the driver's attention and sequentially lit toward the instrument cluster directing and allowing the driver time to re-focus on the instrument cluster to view the warning provided.

The hazard detection system 18 is shown as a blind spot detection system in FIGS. 2A-2B, however, the hazard detection system 18 could be another type of hazard detection system 18. For example, the hazard detection system 18 could warn the driver that he/she needs to brake to avoid hitting an obstacle, or to move over to avoid an obstacle. Additional forms of the hazard detection system 18 could include electronic stability control systems, adaptive cruise control, collision warning systems, lane departure warning systems, or any other desired hazard detection system. For example, a collision warning system provides a pinpoint warning indicating where a collision is about to occur using the driver assistance system 11 in a manner similar to that described above with regards to the blind spot detection. This pinpoint type warning may be useful with back up assist systems where objects may be smaller and not visible to the driver, to distinguish from objects that frequently trigger warnings in a back up assist system. For example, a tree close to a driveway may frequently trigger a warning. However, an object in the driveway might not be visible and may trigger a warning as well. Pinpoint lighting of the alert lights 20 will allow a driver to distinguish between the two objects.

As mentioned above, the alert lights 20 may be illuminated in multiple colors and/or intensity to indicate the urgency of the warning. Additionally, in some examples, the alert lights 20 include multiple rows of lights. The number of rows illuminated may correspond to the severity of the warning, or the multiple rows could be used to illuminate shapes, e.g. arrows, X's, letters, etc. The base brightness of the alert lights 20 in some examples is based on the level of ambient lighting at the time. In these examples, the alert lights 20 change in intensity to indicate the severity of a warning with a higher intensity indicating a more sever warning.

Figure 3:
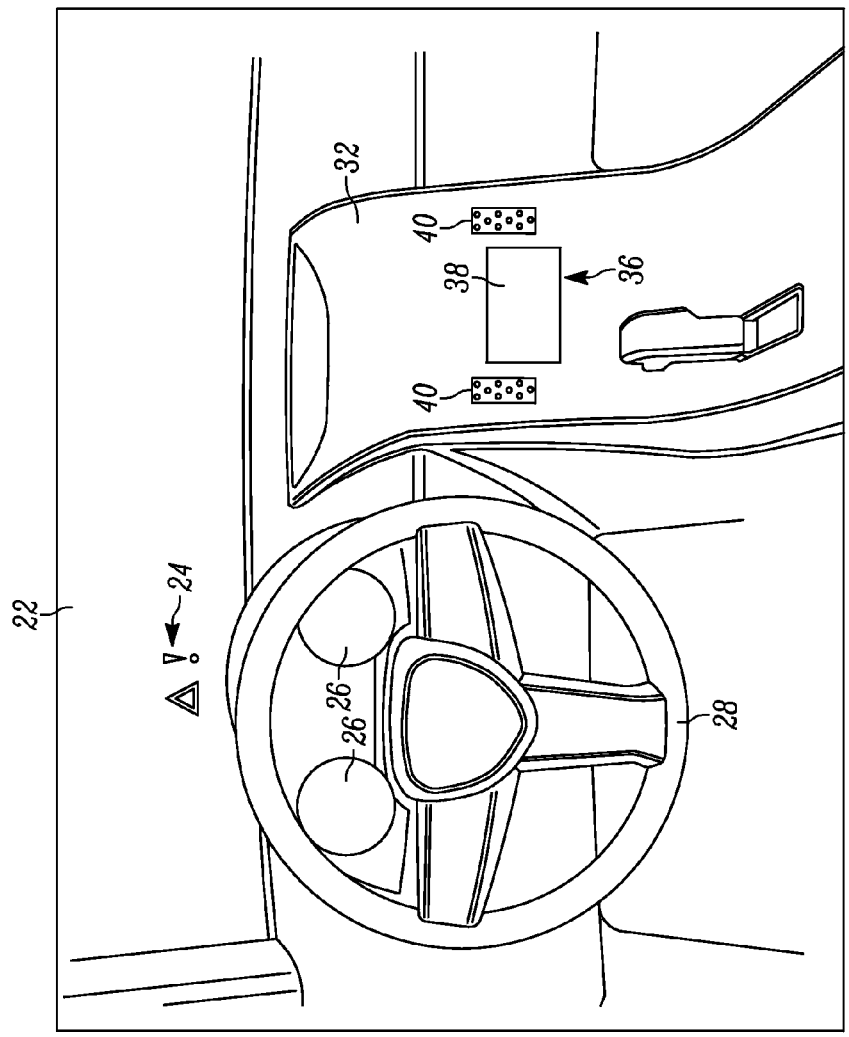
FIG. 3 is schematic view from the rear of an interior of a vehicle incorporating the driver assistance system of FIGS. 1-2B, in accordance with the principles of the present disclosure.

The alerting system 14 need not necessarily including the lights 20 that substantially surround the interior of the vehicle 10, or even if the alerting system 14 does include the lights 20, it may also include other components. For example, referring now to FIG. 3, a portion of an interior 13 in the vehicle 10 is illustrated. The interior 13 includes a windshield 22 including a head up display (HUD) 24 visible to the driver on the windshield 22 of the vehicle 10. The alerting system 14 may include the head up display (HUD) 24, and the alert may be displayed to the driver via the head up display (HUD) 24.

The interior 13 may also include an instrument cluster 26 disposed adjacent to, or forward of, the steering wheel 28. The alerting system 14 may include the instrument cluster 26, and the alert may be displayed to the driver via the instrument cluster 26. Further, the interior 13 may include a center area 30 of a front instrument panel 32. The alerting system 14 may include the center area 30, or any other part of the front instrument panel 32, and the alert may be displayed to the driver via the front instrument panel 32. Trim lighting 34 may also be used to alert the driver as part of the alerting system 14. The trim lighting 34 may or may not be part of the system of lights 20 described earlier.

In yet further alternate examples, the alerting system 14 include an infotainment system 36. The infotainment system 36 includes a wireless connection to a data network. Through the connection to the data network, the infotainment system 36 can gather news tickers, sports scores, or any other appropriate information. In some variations, the information gathered by the infotainment system 36 may be provided to the controller 16 and affect the alert lights 20 or another alerting device of the alerting system 14. For example, the controller 16 can then detect when the vehicle 10 is not moving and display the gathered information for the driver. In some variations, the lights 20 may be configured to display text and/or symbolic information received from the infotainment system 36. In other variations, the infotainment system 36 may display the alert on a screen 38, or by another means.

In another example, the interior 13 may include one or more audio speakers 40 or other audio output devices. The alert may be an audio alert which is played as a warning sound or message for the driver over the speakers 40 or other audio output devices.

Figure 4:
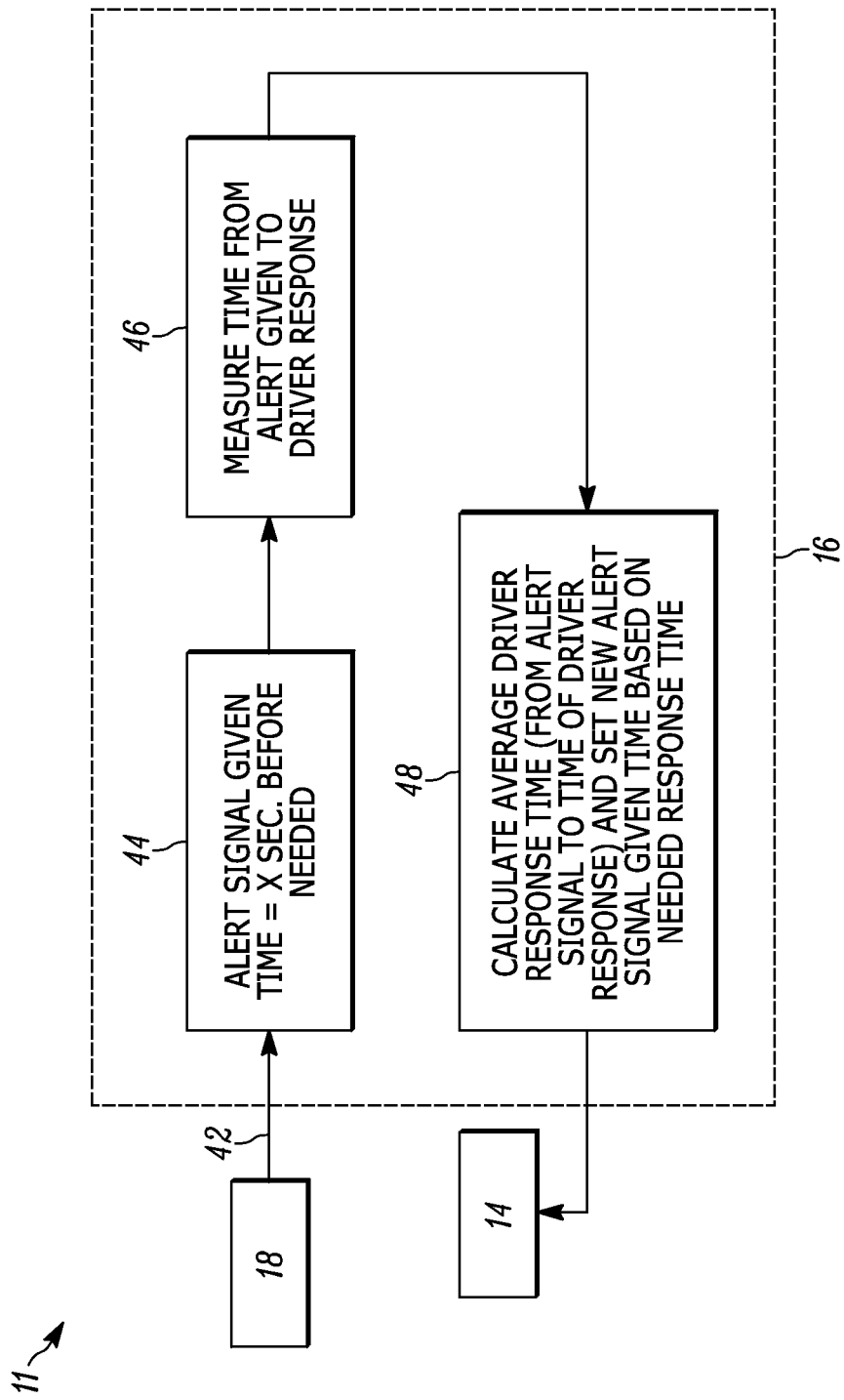
FIG. 4 is a schematic block diagram of the driver assistance system of FIGS. 1-3, according to the principles of the present disclosure.

Referring now to FIG. 4, additional details of the driver alert system 11 are illustrated. As described above, the hazard detection system 18 is configured to detect a hazard. In some variations, the hazard detection system 18 monitors the exterior environment for hazards. When a hazard is detected, the hazard detection system 18 sends a hazard signal 42 to the controller 16. Upon receiving the hazard signal 42, the controller 16 communicates with the alerting system 14 to produce an alert system. The alert is produced a predetermined reaction time period before a desired driver response. The first time that the system 11 receives the hazard signal 42, the predetermined reaction time period is set to a preset time period, based on the type of hazard and preprogramming of the system 11. For example, if an object is in the path of travel, the alert may be produced three seconds before it is desired that the driver brake to avoid hitting the object.

However, the preset time period may not always be the ideal predetermined reaction time period for a particular driver. Accordingly, the driver assistance system 11 is configured to "learn" the appropriate reaction time for the particular driver and set the predetermined reaction time period accordingly. Thus, the controller 16 is configured to determine a driver response time after the alert signal is provided. As shown in FIG. 4, controller 16 may determine the time that an alert was given in a first control logic 44. For example, the first control logic 44 may determine that the alert signal was given at a time of X seconds before a driver response was desired.

In a second control logic 46, the controller 16 may determine, or measure, how much time elapsed between the time the alert was given until the time that the driver actually responded appropriately. If the actual driver response time varied beyond a predetermined threshold from the time the system 11 originally desired the response, the controller 16 is configured to alter the predetermined reaction time period.

In other words, the alert is produced by the alerting system 14 a predetermined reaction time period before a desired driver response. The controller 16 is configured to determine a driver response time, where the driver response time includes the time from the alert to an actual driver response. The controller 16 is then configured to alter the predetermined reaction time period based on the driver response time.

In some variations, more than one, or several, driver response times are determined. For example, the system may determine the actual driver reaction each time an alert is provided and an actual driver response is made. The controller 16 may be configured to calculate an average response time based on the several driver response times determined or measured. The controller 16 then alters the predetermined reaction time period based on the average response times. For example, the controller 16 may include a third control logic 48 that calculates the average driver response time (from the alert signal to the time of the driver response), and sets a new Alert Signal Given Time, or predetermined reaction time period, based on the needed response time of the driver.

For example, some drivers need additional time to react to an alert. In such cases, the controller 16 is configured to increase the predetermined reaction time period if the average response time is longer than the original desired response time (or the preset response time). In this way, the driver will receive the alert earlier, which will give the driver additional time to react in response to the alert.

In other cases, certain drivers may have faster reaction times, such that an alert may come too early and be an annoyance. In such cases, the controller 16 may be configured to shorten the predetermined reaction time period to a length more suitable for the fast-reacting driver.

Figure 5:
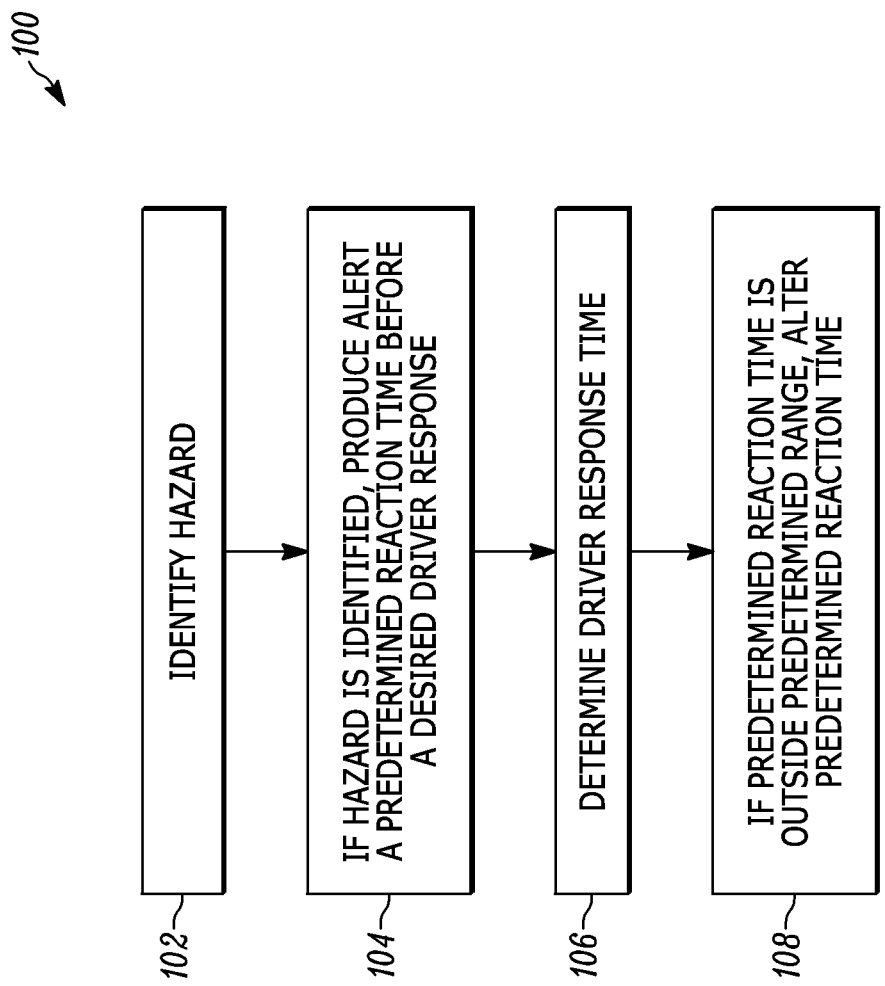
FIG. 5 is a schematic block diagram illustrating a method for assisting a driver of a vehicle, in accordance with the principles of the present disclosure.

FIG. 5 illustrates a method 100 for assisting a driver of a vehicle. The method 100 may be incorporated into a non-transitory machine-readable medium that provides instructions, which when executed by a machine, cause the machine to perform operations, in some examples.

The method 100 includes a step 102 of identifying a hazard, for example, with a hazard detection system and/or device(s) 18. The method 100 then includes a step 104 of producing an alert if a hazard is identified by the hazard detection system, including producing the alert a predetermined reaction time period before a desired driver response. The method 100 further includes a step 106 of determining a driver response time, where the driver response time includes the time from the alert to an actual driver response. The method 100 also includes a step 108 of altering the predetermined reaction time period if the driver response time determined is outside of a predetermined range.

The method 100 may also include determining at least one additional driver response time and calculating an average response time based on the first determined driver response time and the one or more additional driver response times determined. The step 108 of altering the predetermined reaction time period may include altering the predetermined reaction time period if the average response time is outside of a predetermined range.

In some variations, the step 108 of altering the predetermined reaction time period includes increasing the predetermined reaction time period if the average response time is longer than the predetermined range.

The method 100 may be used with or without the driver assistance system 11 described above, or the method 100 may have additional steps or features described above with respect to the driver assistance system 11. For example, the step 104 of producing an alert may include illuminating at least one light of a plurality of lights, such as the lights 20, linearly arranged substantially around an interior perimeter of a vehicle in response to identifying the hazard, thereby indicating a location of the hazard to the driver. The plurality of lights may be linearly arranged substantially around the interior perimeter of the vehicle at least substantially circumscribing the interior of the car. Further the method 100 may include illuminating the plurality of lights sequentially thereby directing the driver's attention toward the location of the hazard. In some versions, the step 104 of producing the alert includes producing an audio alert. The step 104 of producing the alert may include displaying an alert image on at least one of: a head up display visible to the driver on a windshield of the vehicle; an instrument cluster located adjacent to a steering wheel; a center area of a front instrument panel; and/or trim lighting within the vehicle.

A non-transitory machine-readable medium may be provided that provides instructions, which when executed by a machine, cause the machine to perform operations, such as the method 100. For example, the operations may include identifying a hazard using a hazard detection system, producing an alert if a hazard is identified by the hazard detection system, including producing the alert a predetermined reaction time period before a desired driver response, determining a driver response time, the driver response time including the time from the alert to an actual driver response, and altering the predetermined reaction time period if the driver response time determined is outside of a predetermined range.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An apparatus for alerting a driver within an automotive vehicle, the apparatus comprising:
   an alerting device disposed within the vehicle, the alerting device being configured to alert a driver;
   a controller controllably coupled to the alerting device, the controller being operable to activate the alerting device to produce an alert; and
   a hazard detecting device communicatively coupled to the controller, the hazard detecting device being configured to detect a hazard,
   wherein the controller is configured to activate the alerting device to produce the alert if the hazard detecting device detects a hazard, the alert being produced a predetermined reaction time period before a desired driver response, the controller configured to determine at least one driver response time, the driver response time including the time from the alert to an actual driver response, the controller being configured to alter the predetermined reaction time period based on the at least one driver response time;
   wherein the alerting device comprises a plurality of lights linearly arranged substantially around an interior perimeter of the vehicle such that the plurality of lights are easily visible to the driver of the vehicle regardless of a direction in which the driver is looking;
   the controller being configured to illuminate at least one of the plurality of lights corresponding to a location of a hazard detected by the hazard detecting device, the detected hazard being in a first direction from the driver, and the at least one illuminated light being in a second direction from the driver that is substantially the same as the first direction such that a location of the at least one illuminated light indicates to the driver of the vehicle the first direction in which the hazard was detected.

2. The apparatus of claim 1, wherein the at least one driver response time includes a plurality of driver response times, wherein the controller is configured to calculate an average response time from the plurality of driver response times, the controller being configured to alter the predetermined reaction time period based on the average response time.

3. The apparatus of claim 2, wherein the controller is configured to increase the predetermined reaction time period if the average response time is longer than a desired response time.

4. The apparatus of claim 1, wherein the apparatus further comprises an infotainment system and wherein the plurality of lights are configured to display at least one of text and symbolic information received from the infotainment system.

5. The apparatus of claim 1, wherein the alerting device comprises at least one audio speaker, wherein the alert is an audio alert, the audio speaker being configured to produce the audio alert.

6. A driver assistance system for alerting a driver within an automotive vehicle, the driver assistance system comprising:
an alerting system disposed within the vehicle, the alerting system being configured to alert a driver;
a controller controllably coupled to the alerting system, the controller being operable to activate the alerting system to produce an alert; and
a hazard detection system communicatively coupled to the controller, the hazard detection system being configured to detect a hazard,
wherein the controller is configured to activate the alerting system to produce the alert if the hazard detection system detects a hazard, the alert being produced a predetermined reaction time period before a desired driver response, the controller configured to determine at least one driver response time, the driver response time including the time from the alert to an actual driver response, the controller being configured to alter the predetermined reaction time period based on the at least one driver response time;
the alerting system includes a plurality of lights linearly arranged substantially around an interior perimeter of the vehicle such that the plurality of lights are easily visible to the driver of the vehicle regardless of a direction in which the driver is looking;
the controller being configured to illuminate at least one of the plurality of lights corresponding to a location of a hazard detected by the hazard detection system, the detected hazard being in a first direction from the driver, and the at least one illuminated light being in a second direction from the driver that is substantially the same as the first direction such that a location of the at least one illuminated light indicates to the driver of the vehicle the first direction in which the hazard was detected.

7. The driver assistance system of claim 6, wherein the at least one driver response time includes a plurality of driver response times, wherein the controller is configured to calculate an average response time from the plurality of driver response times, the controller being configured to alter the predetermined reaction time period based on the average response time.

8. The driver assistance system of claim 7, wherein the controller is configured to increase the predetermined reaction time period if the average response time is longer than a desired response time.

9. The driver assistance system of claim 6, wherein the alerting system comprises at least one audio speaker, wherein the alert is an audio alert, the audio speaker being configured to produce the audio alert.

10. A method for assisting a driver of a vehicle, the method comprising the steps of:
identifying a hazard using a hazard detection system;
producing an alert if a hazard is identified by the hazard detection system, including producing the alert a predetermined reaction time period before a desired driver response;
determining a driver response time, the driver response time including the time from the alert to an actual driver response; and
altering the predetermined reaction time period if the driver response time determined is outside of a predetermined range;
wherein the step of producing an alert includes illuminating at least one light of a plurality of lights linearly arranged substantially around an interior perimeter of the vehicle, thereby indicating to the driver a direction in which the hazard is located, wherein the plurality of lights linearly arranged substantially around the interior perimeter of the vehicle at least substantially circumscribes the interior of the car.

11. The method of claim 10, wherein the driver response time is a first driver response time, the method further including determining at least one additional driver response time, the method further including calculating an average response time based on the first driver response time and the at least one additional driver response time, the step of altering the predetermined reaction time period including altering the predetermined reaction time period if the average response time is outside of a predetermined range.

12. The method of claim 11, wherein the step of altering the predetermined reaction time period includes increasing the predetermined reaction time period if the average response time is longer than the predetermined range.

13. The method of claim 10, wherein the step of producing the alert by illuminating at least one light comprises illuminating a plurality of lights sequentially thereby directing the driver's attention toward the location of the hazard.

14. The method of claim 10, wherein the step of producing the alert includes producing an audio alert.

15. A non-transitory machine-readable medium that provides instructions, which when executed by a machine, cause the machine to perform operations comprising:
identifying a hazard using a hazard detection system;
producing an alert if a hazard is identified by the hazard detection system, including producing the alert a predetermined reaction time period before a desired driver response;
determining a driver response time, the driver response time including the time from the alert to an actual driver response; and
altering the predetermined reaction time period if the driver response time determined is outside of a predetermined range;
wherein the step of producing an alert includes illuminating at least one light of a plurality of lights linearly arranged substantially around an interior perimeter of the vehicle, thereby indicating to the driver a direction in which the hazard is located, wherein the plurality of lights linearly arranged substantially around the interior perimeter of the vehicle at least substantially circumscribes the interior of the car.

* * * * *